United States Patent
Bajic et al.

(10) Patent No.: US 11,670,877 B2
(45) Date of Patent: Jun. 6, 2023

(54) GROUNDING CLAMP WITH LATERAL ANTI-TWIST PROTECTION

(71) Applicant: MD ELEKTRONIK GmbH, Waldkraiburg (DE)

(72) Inventors: Marijela Bajic, Waldkraiburg (DE); Markus Huber, Kirchdorf (DE); Hubert Huber, Kirchdorf (DE); Christoph Woerz, Ampfing (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 2 days.

(21) Appl. No.: 17/517,684

(22) Filed: Nov. 3, 2021

(65) Prior Publication Data
US 2022/0158369 A1 May 19, 2022

(30) Foreign Application Priority Data
Nov. 19, 2020 (DE) ...................... 20 2020 106 633.1

(51) Int. Cl.
*H02G 3/32* (2006.01)
*H01R 4/64* (2006.01)
(Continued)

(52) U.S. Cl.
CPC .............. *H01R 4/646* (2013.01); *H01R 4/184* (2013.01); *H01R 4/308* (2013.01); *H02G 3/32* (2013.01)

(58) Field of Classification Search
CPC .............. H01R 4/04; H01R 4/30; H01R 4/34; H01R 4/66; H01R 4/308; H01R 4/184;
(Continued)

(56) References Cited

U.S. PATENT DOCUMENTS

| 5,934,923 A * | 8/1999 | Matsuoka | H01R 11/12 439/287 |
| 7,125,295 B2 * | 10/2006 | Zhao | H01R 11/12 439/907 |
| 7,384,281 B2 * | 6/2008 | Matsuoka | H01R 4/183 439/92 |
| 9,300,093 B2 * | 3/2016 | Omori | H01R 13/648 |
| 9,748,716 B2 * | 8/2017 | Uehara | H01R 25/003 |
| 10,367,277 B2 * | 7/2019 | Lee | H01R 11/09 |

(Continued)

FOREIGN PATENT DOCUMENTS

| DE | 102006008056 B4 | 10/2013 |
| DE | 102015205276 A1 | 10/2015 |

(Continued)

*Primary Examiner* — William H. Mayo, III
(74) *Attorney, Agent, or Firm* — Leydig, Voit & Mayer, Ltd.

(57) ABSTRACT

A grounding clamp includes a plate having a first and second opposite longitudinal edges extending in a first direction, and first and second opposite transverse edges extending perpendicularly to the longitudinal edges in a second direction. First and second cable fastening region extend along the first and second transeverse edges, respectively, and are configured to fasten and electrically contact first and second cables to the plate, respectively. An opening is arranged between the cable fastening regions for inserting a fastener. An arm extends from the first or second longitudinal edge in the second direction so that the arm runs parallel to the first and/or second cable fastening region. A tab extends at a free end of the arm parallel to the first and/or second longitudinal edge and perpendicularly to a plane of the plate in a direction of an underside of the plate.

19 Claims, 5 Drawing Sheets

(51) Int. Cl.
*H01R 4/18* (2006.01)
*H01R 4/30* (2006.01)

(58) Field of Classification Search
CPC .......... H01R 4/185; H01R 4/188; H01R 4/64;
H01R 4/646; H01R 11/09; H01R 11/12;
H01R 11/28; H01R 11/32; H01R 43/048;
H01R 41/26; H01R 13/28; H01R 13/618;
H01R 13/648; H02G 3/32
USPC ....... 174/74 R, 76, 84 R, 880, 88 C; 439/98,
439/92, 287, 288, 289, 516, 585, 883,
439/907, 431–433, 607–610
See application file for complete search history.

(56) References Cited

U.S. PATENT DOCUMENTS

| 2005/0003703 | A1* | 1/2005 | Ono ........................ H01R 11/26 |
| | | | 439/516 |
| 2006/0189184 | A1* | 8/2006 | Onuma ................ H01R 9/0518 |
| | | | 439/98 |
| 2007/0072455 | A1* | 3/2007 | Onuma ................ H01R 9/0518 |
| | | | 439/98 |
| 2010/0112858 | A1* | 5/2010 | Takayama ................ H01R 4/20 |
| | | | 439/585 |
| 2017/0155200 | A1* | 6/2017 | Yamamoto ............... H01R 4/20 |

FOREIGN PATENT DOCUMENTS

| DE | 112014002495 T5 | 3/2016 |
| DE | 102016223522 A1 | 6/2017 |
| JP | 2003187884 A | 7/2003 |

\* cited by examiner

GROUNDING CLAMP WITH LATERAL ANTI-TWIST PROTECTION

CROSS REFERENCE TO RELATED APPLICATIONS

This application claims benefit to German Patent Application No. DE 20 2020 106 633.1, filed on Nov. 19, 2020, which is hereby incorporated by reference herein.

FIELD

The present invention relates to a grounding clamp for attaching and electrically contacting two cables to a separate surface.

BACKGROUND

Grounding clamps are used in the automotive industry to fasten electrical lines or cables in a vehicle at specific locations and to connect, i.e., to ground, the ground line of a cable to the vehicle body. Cables that are installed in a vehicle are, for example, antenna lines for an antenna radio and can be coaxial cables. By being fastened, the cable is routed through the vehicle on a prespecified path. The connection of the ground line of the cable to the vehicle body, which is or must be electrically conductive, applies the potential of the ground line to the ground potential of the body, and thus grounds the line.

In previous applications, for fastening two, in particular parallel, cables a single grounding clamp was used for each cable, wherein the two grounding clamps were plugged into each other during installation in the vehicle. However, the use of two individual grounding clamps increased the complexity in installing wiring harnesses in a vehicle.

Publication DE 10 2006 008 056 B4 describes a grounding plate for fastening and grounding coaxial cables. The grounding plate has at least one plate, at one end of which two coaxial cables can be held. At a distance from the holding region of the coaxial cables, the plate has a screw-hole through which a screw is guided in order to fasten the grounding plate. If torques occur on the grounding plate, for example due to tensile forces in the cables, the screw connection at the screw hole can be unintentionally loosened or released.

SUMMARY

In an embodiment, the present invention provides a grounding clamp for fastening and electrically contacting at least two cables to a separate surface. The grounding clamp includes a plate having a first longitudinal edge and a second longitudinal edge opposite the first longitudinal edge, wherein the first and second longitudinal edges extend in a first direction of the plate. The plate also has a first transverse edge and a second transverse edge opposite the first transverse edge, wherein the first and second transverse edges extend perpendicularly to the first and second longitudinal edges in a second direction of the plate. A first cable fastening region is configured to fasten and electrically contact a first cable to the plate, wherein the first cable fastening region extends along the first transverse edge. A second cable fastening region is configured to fasten and electrically contact a second cable to the plate, wherein the second cable fastening region extends along the second transverse edge. An opening is arranged between the first and second cable fastening regions for inserting a fastener. An arm extends from the first or second longitudinal edge in the second direction so that the arm runs parallel to the first and/or second cable fastening region. A tab extends at a free end of the arm parallel to the first and/or second longitudinal edge and perpendicularly to a plane of the plate in a direction of an underside of the plate.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
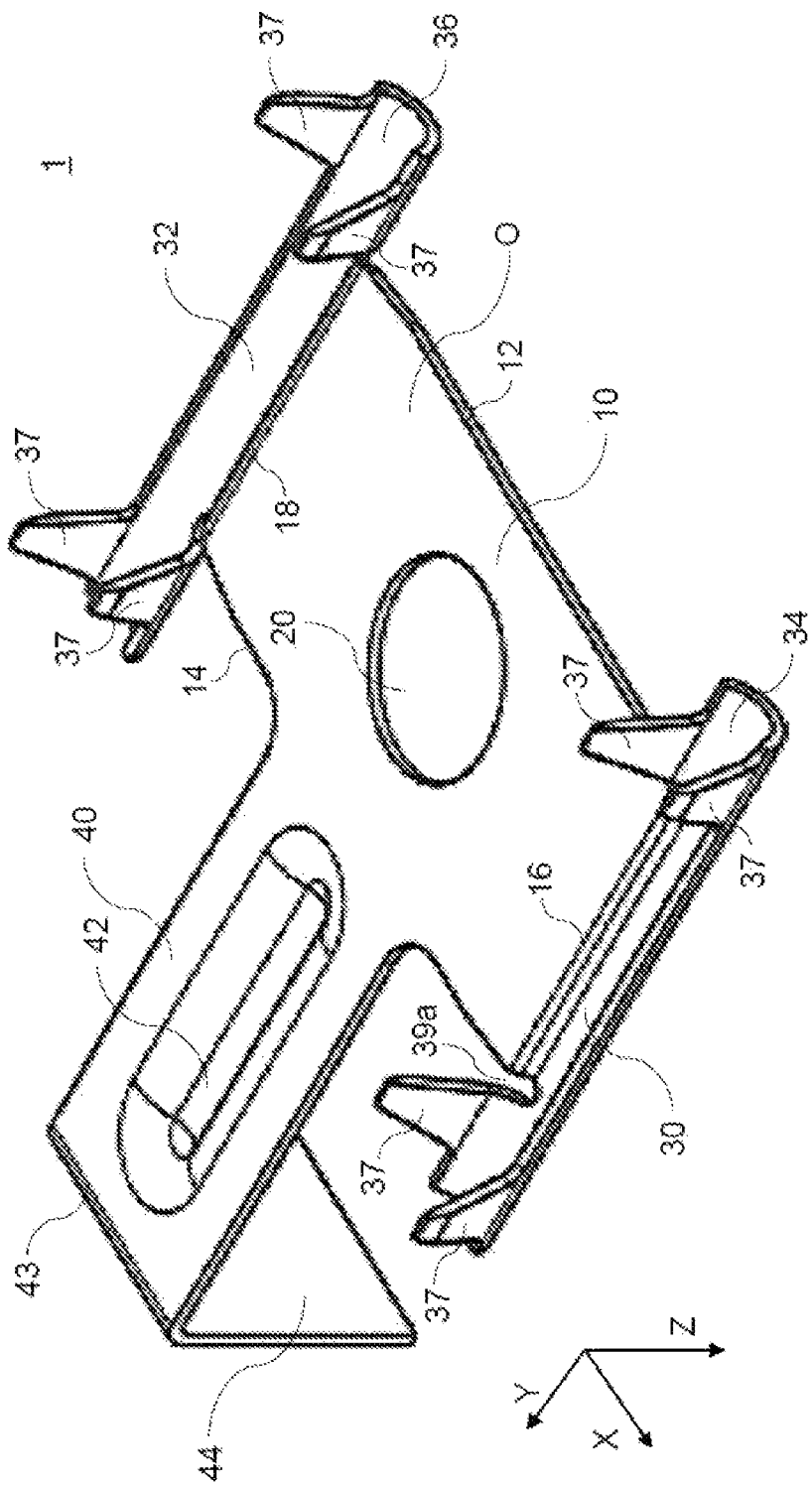
FIG. 1 illustrates an isometric view of a first embodiment of the grounding clamp according to the present invention.

In an embodiment, the present invention provides a grounding clamp which in the installed state is protected against undesired rotation and has a clearly visible orientation.

In particular, a grounding clamp which in the installed state is protected against undesired rotation and has a clearly visible orientation is achieved according to an embodiment of the present invention by a grounding clamp for fastening and electrically contacting at least two cables to a separate surface. The grounding clamp has a plate with a first longitudinal edge and a second longitudinal edge opposite the first longitudinal edge, wherein both longitudinal edges extend in a first direction of the plate, and the plate has a first transverse edge and a second transverse edge opposite the first transverse edge, wherein both transverse edges extend perpendicularly to the first and second longitudinal edges in a second direction of the plate. Furthermore, the grounding clamp has a first cable fastening region for attaching and electrically contacting a first cable to the plate, wherein the first cable fastening region extends along the first transverse edge, and a second cable fastening region for fastening and electrically contacting a second cable to the plate, wherein the second cable fastening region extends along the second transverse edge. Furthermore, an opening arranged between the first and second cable fastening regions for inserting a fastener, an arm extending from the first or second longitudinal edge in the second direction so that the arm runs parallel to the first and/or second cable fastening region, and a tab extending at a free end of the arm parallel to the first and/or second longitudinal edge and perpendicular to the plate plane in the direction of an underside of the plate.

The grounding clamp is manufactured as a one-piece component. Two separate cables can thus be fastened and electrically contacted with only one grounding clamp. This saves installation time, and the number of components is reduced compared to, for example, an arrangement of two grounding clamps in each case for one cable. With respect to the grounding clamp, the two cables are furthermore held at a distance that substantially corresponds to a side length of the grounding clamp. Undesired entanglements of the two cables are prevented by this spacing. In addition, the two cables are accommodated in cable fastening regions. To make it easier to hold the cable, the cable fastening regions preferably each have a cable guide and at least two U-shaped or V-shaped holding regions, each comprising at least two crimp tabs. The holding regions each having at least two crimp tabs are also the crimp regions for fastening the cables to the grounding clamp.

The opening in the plate of the grounding clamp makes it possible to introduce or lead through a fastener such as a screw or a bolt. The grounding clamp can be easily, quickly, and securely fastened to a separate surface via the fastener. Since the opening is in the center between the two cable fastening regions, unwantedly occurring torques, for example due to tensile forces on the cables, will only have short lever arms and be therefore less effective than when there is an opening located away from the cable fastening regions.

The arm extends visibly away from the plate and gives the grounding clamp a clearly visible orientation. The visible orientation facilitates alignment of the grounding clamp during installation. The arm extends in the direction of the cable fastening regions, i.e., also in the direction of the cables to be fastened. In particular, the arm lies parallel to the cable fastening regions and the cable to be fastened. If cables fastened to the grounding clamp are subjected to tensile or compressive forces in their longitudinal direction, these will generate undesired forces due to the parallel alignment of the cables with the arm but no torque on the arm. This improves the fastening of the grounding clamp to a separate surface. In particular, the arm lies below or between the cables to be fastened, which forms a space-saving arrangement.

The tab projects, in particular perpendicularly, in the direction of the underside of the plate. During installation, the tab is engaged with a corresponding recess or opening in the separate surface on which the grounding clamp is to be fastened. The depth of the tab is designed such that the tab securely engages in the recess or opening and will not, for example, jump out again due to the grounding clamp turning or slightly moving. After installation, the tab is arranged in a twist-proof manner in the recess, preferably in a positive-locking manner, so that in the installed state the tab provides anti-twist protection for the grounding clamp.

Optionally, the arm has at least one recess. The recess increases the stability of the arm. The arm can thus be made thinner with the same stability, which at least saves material and weight. In particular, when a fastener such as a nut is tightened to the grounding clamp, undesired deformation of the arm due to torque on the grounding clamp is prevented by the recess.

Optionally, the recess extends in the second direction for at least half of an arm length, preferably at least ¾ of the arm length, and more preferably at least ⅞ of the arm length. The longer the recess extends along the arm, the greater the stability due to the recess. In an alternative embodiment, the arm has a plurality of smaller or shorter recesses over the arm length.

Optionally, the arm has a rectangular shape. The rectangular shape over the entire bar length increases stability in comparison to shapes in which, for example, an arm width varies or decreases with the arm length toward the free end.

Optionally, the tab extends over an entire width of the arm. As a result, the tab has a broad connection to the arm, which makes the connection stable. Furthermore, due to the broad connection, the tab receives as long a first side surface as possible, which overall leads to a larger contact surface. A large contact surface simplifies installation and leads to better force distribution, which increases the durability of the grounding clamp.

Optionally, a depth of the tab is more than ⅛ of an arm length, preferably more than ¼ of an arm length, and more preferably more than ½ of an arm length. In particular, the depth of the tab is greater than a maximum depth of the recess in the arm so that the tab can securely engage in the recess or opening of the separate surface. The larger the contact area of the tab, the better the force distribution and the longer the durability of the grounding clamp.

Optionally, the one opening is circular. Since the fastening of the grounding clamp to the separate surface is achieved via a circular opening, the grounding clamp may be placed on a fastener, such as a bolt, in a first installation step, and thereby be (pre-) fastened at one point. In a further installation step, the grounding clamp can be rotated on the bolt until the tab can be inserted into the corresponding opening in the separate surface. The first fastening of the grounding clamp facilitates the final installation.

Optionally, a diameter of the opening corresponds to 6/10, preferably 7/10, more preferably 8/10, of the arm width. The larger the opening for the fastener, the larger the selectable fastener can be. A larger fastener results in a more stable and/or durable fastening of the grounding clamp. Since the opening for the fastener is arranged in a region between the two cable fastening regions and not on the arm, a comparatively large diameter of the opening with respect to the arm width is possible. The stability of the arm is not influenced by the diameter of the opening.

FIG. 1 shows a first embodiment of the grounding clamp 1. The grounding clamp 1 has a rectangular plate 10 with a first and a second longitudinal edge 12, 14 in a first direction, i.e., longitudinal direction X, and a first and a second transverse edge 16, 18 in a second direction, i.e., the transverse direction Y, orthogonal to the longitudinal direction X. The edges 12, 14, 16, 18 of the plate 10 do not take into consideration the cable fastening regions 30, 32. In another embodiment, the plate 10 may also have a square shape.

The grounding clamp 1 is set up to receive a cable, preferably a coaxial cable, in each case in a cable fastening region 30, 32. The first or second cable fastening region 30, 32 extends in each case along the first or second transverse edge 16, 18 of the plate 10. A crimp region 38*a, b, c* or *d* is arranged at each end of a cable fastening region 30, 32 in the transverse direction Y (see FIG. 2). In order to fasten a cable to the grounding clamp 1, the cable is aligned in the first or second cable fastening region 30, 32. A first and second cable guide 34, 36 here simplifies the arrangement of the cable. Furthermore, the crimp regions 38*a, b, c, d* have a U-shaped or V-shaped taper to the cable guide 34, 36 of the respective first or second cable fastening region 30, 32 (see FIG. 3). The taper is formed in each crimp region 38*a, b, c, d* by at least two opposing crimp tabs 37. A length of the crimp tabs 37 is preferably adapted to the cable thickness. The thicker the at least one cable to be fastened, the longer the corresponding crimp tabs 37 will be formed. In order to fasten a cable, the crimp tabs 37 of both crimp regions 38*a, b* or 38*c, d* are bent towards the center of the cable, and the cable is crimped with the crimp tabs 37. The crimp regions 38*a, b, c, d* preferably have a structured surface in order to achieve better, in particular more durable, fastening during crimping. As a result of crimping, the cable is firmly connected to the grounding clamp 1. The crimped crimp tabs 37 can also have a direct contact with a ground line of the cable. The ground line of the cable was preferably stripped in the crimp regions 38*a, b* or 38*c, d* for this direct contact. The direct contact results in an electrical connection of the ground line of the cable and the grounding clamp 1.

Figure 5:
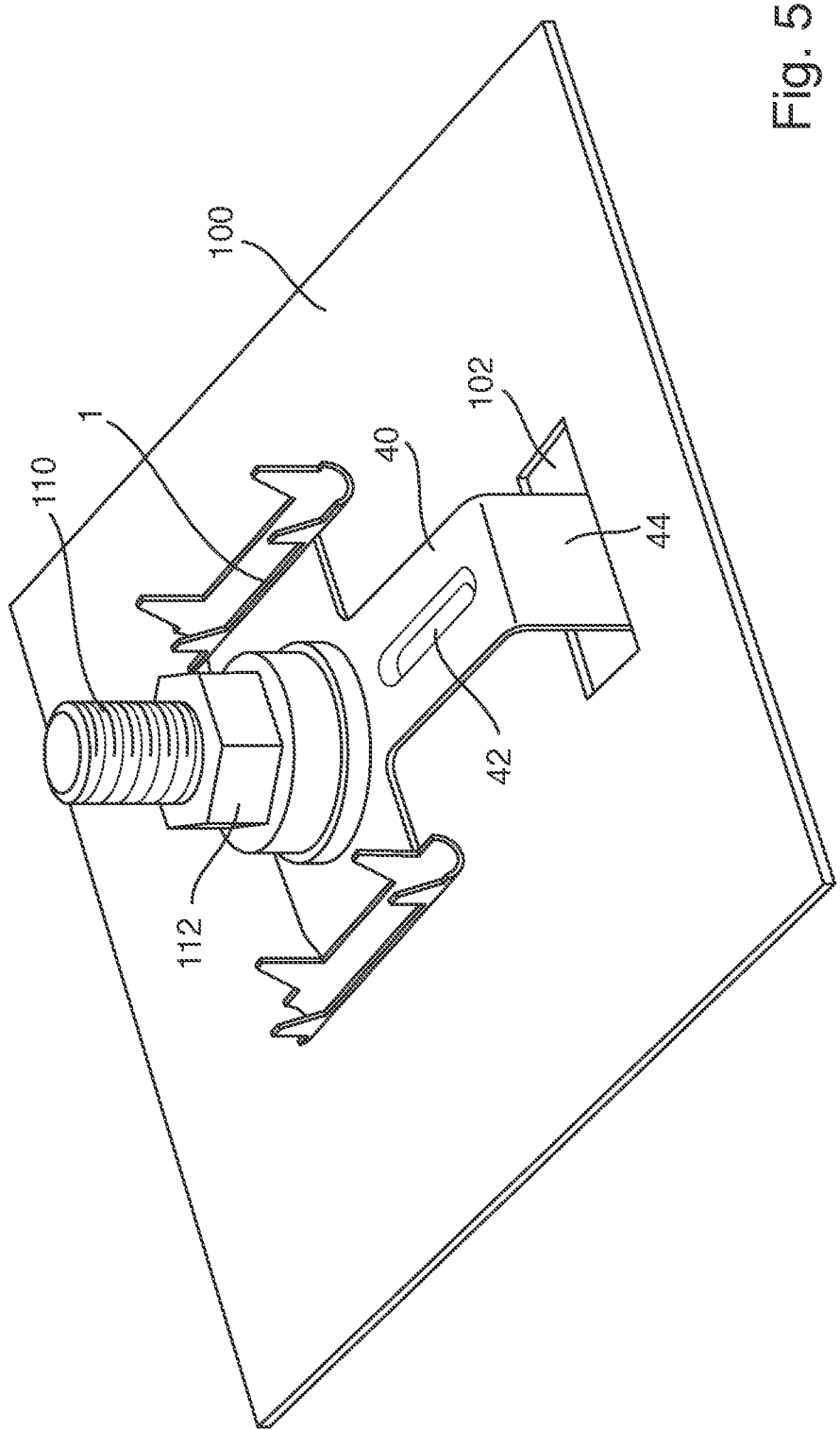
FIG. 5 an illustration of the first embodiment of the grounding clamp in the mounted state.

Furthermore, the grounding clamp 1 may be fastened to a separate body or a surface 100 via a fastener 110, such as a screw or a bolt, which is guided through the opening 20 in the plate 10 (see FIG. 5). Like the grounding clamp 1, the fastener 110 is preferably electrically conductive and in particular made of metal. Due to the electrical conductivity of the components, an electrical connection can be established between the cables fastened to the grounding clamp 1, in particular the ground lines of the cables, and the surface 100 on which the grounding clamp 1 is fastened.

The embodiment of the grounding clamp 1 illustrated furthermore has, at the second longitudinal edge 14, an arm 40 which extends away from the plate 10 in the transverse direction Y. In an alternative embodiment, the arm 40 may extend away from the first longitudinal edge 12. The arm 40 is formed integrally with the plate 10. The arm 40 has a recess 42 which extends along the arm 40 in the transverse direction Y.

The recess 42 is preferably introduced into the arm 40 by mechanical methods, such as pressing and/or stamping. The aforementioned or similar methods enable simple and inexpensive manufacture of a grounding clamp 1. In particular, the recess 42 is a deformation and not a removal of material. This is because removing material, in particular by erosion and/or openings, leads to reduced stability.

Figure 2:
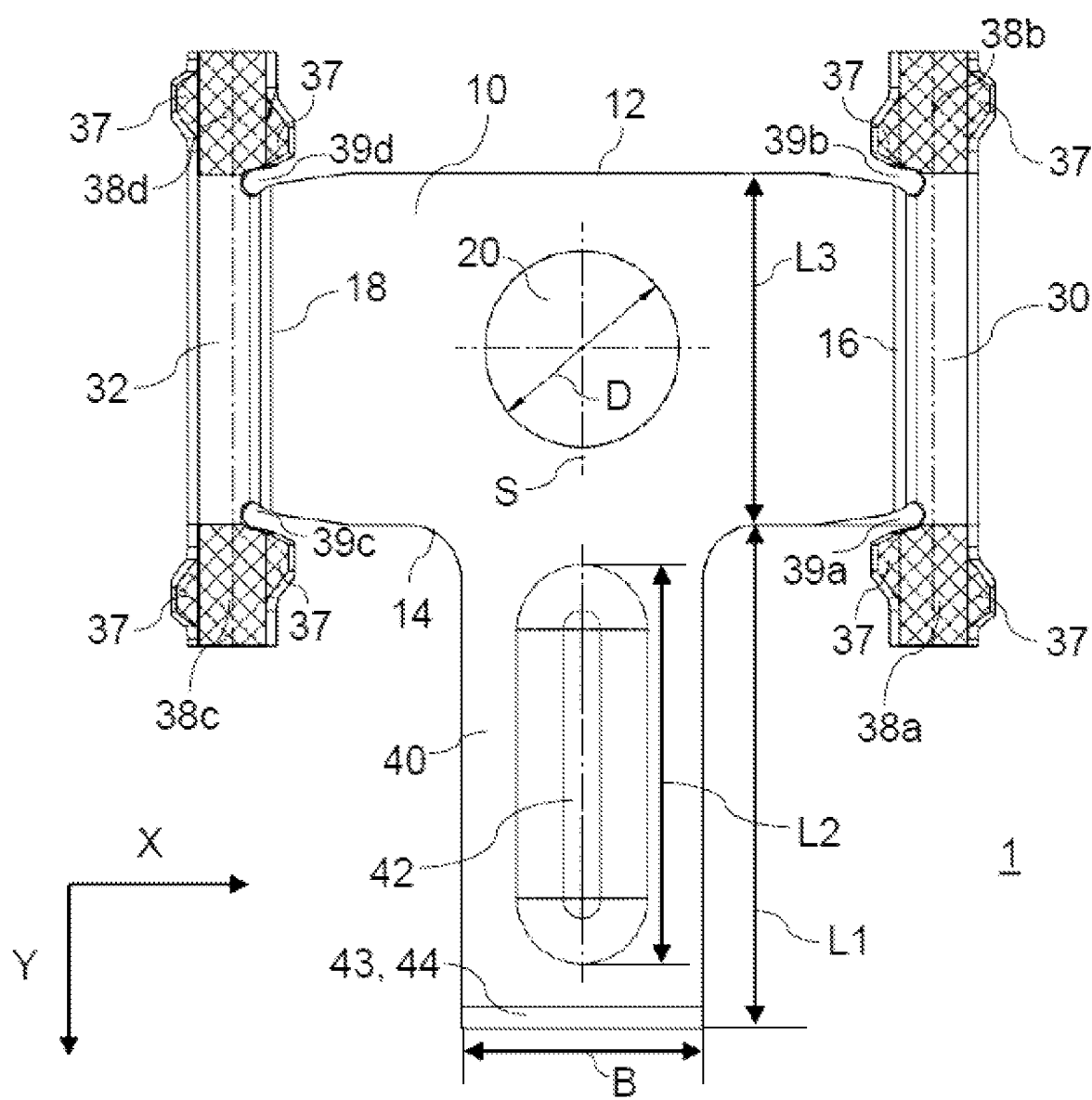
FIG. 2 is a top view of the first embodiment of the grounding clamp.
Figure 4:
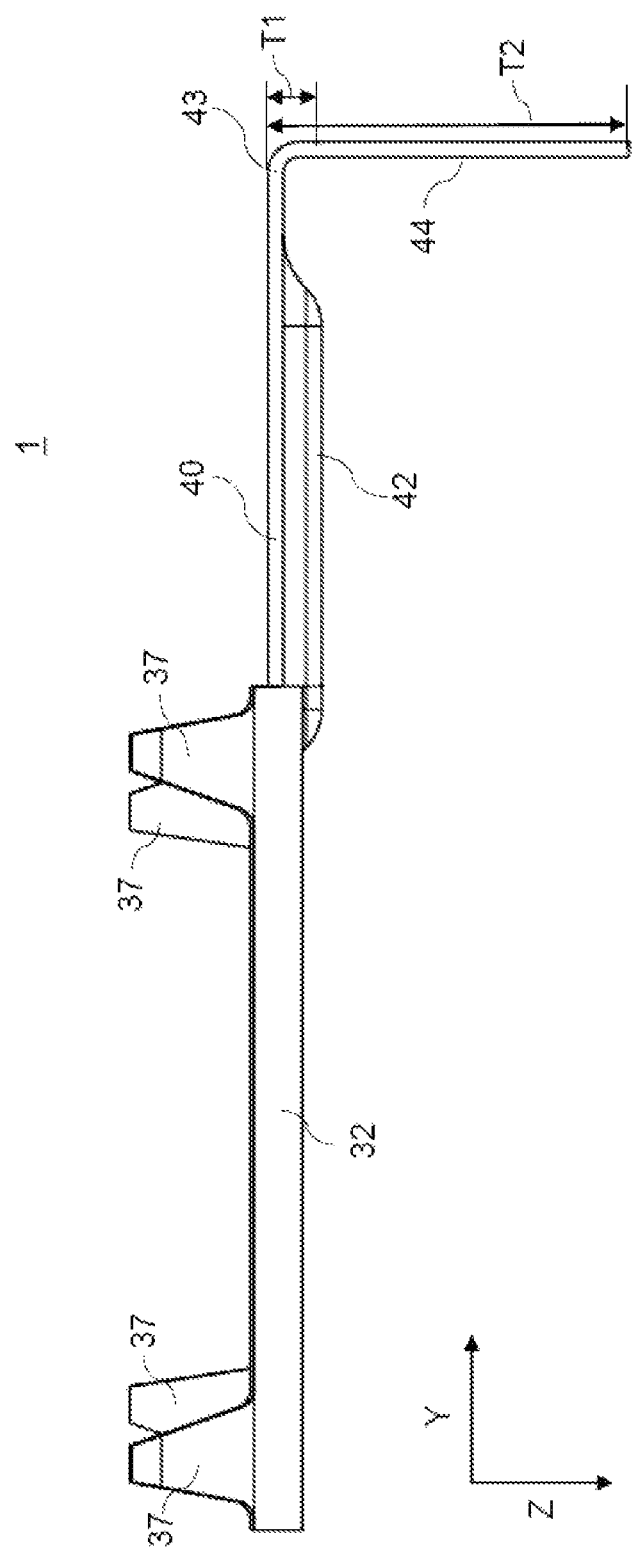
FIG. 4 a side view of the first embodiment of the grounding clamp along a second direction.

In one embodiment, the recess 42 has a depth T1 equal to or less than 1.4 mm in a direction Z toward the underside U of the plate 10 (see FIG. 4). The recess 42 preferably has an oval, shell-like shape in order to prevent sharp edges. Sharp edges present a risk of injury during installation. In another embodiment, instead of a recess 42 having a length L2 as shown in FIG. 1 and FIG. 2, a plurality of smaller recesses can also be arranged along the arm 40, preferably on the length L2, in order to increase the stability of the arm 40. In an alternative embodiment, the recess 42 may be shorter than the length L2, provided that the arm 40 remains stable against twisting and/or deformation.

On its side facing away from plate 10, the arm 40 has a free end 43. The free end 43 forms an edge of the arm 40 which is adjoined by a tab 44. The tab 44 extends, by a depth T2, in the direction Z to the underside U of the plate 10, preferably perpendicularly (see FIG. 4). The tab 44 is preferably formed by bending the arm 40 at its free end 43. The tab 44 is in particular formed integrally with the arm 40 and the plate 10.

Furthermore, it has been recognized by the inventors that the rigidity of the arm 40 increases with a greater length L2 and/or greater depth T1 of the recess 42. In an alternative embodiment, the recess 42 extends further around the free end 43 and onto the tab 44. In this alternative embodiment, in addition to the arm 40, the tab 44 also has the recess 42. The recess 42 in the tab 44 increases the stability of the tab 44, in particular against twisting and/or deformation.

FIG. 2 shows a plan view of the first embodiment of the grounding clamp 1. The grounding clamp 1 is designed symmetrically with respect to a mirror axis S. The mirror axis S runs through the center of the opening 20 and is parallel to the two transverse edges 16, 18. Due to the symmetrical construction, the two cable fastening regions 30, 32 run parallel to one another at a distance which corresponds to the length of the first or second longitudinal edge 12, 14. The symmetrical construction of the grounding clamp 1 compensates for or prevents torque that can occur when tensile forces act on the cables and/or when the distance between each cable and the opening 20 is different.

FIG. 2 in addition shows an offset of opposite crimp tabs 37. This offset improves the result of crimping and strengthens the fastening of the cables to the grounding clamp 1. In particular, an inlet 39*a, b, c, d* in the respective crimp region 38*a, b, c, d* improves the result of the crimping since a flow of the material is made possible during the crimping process.

The opening 20 has a diameter D. The diameter D is adapted to the fastener 110 to be used and preferably receives the fastener 110 in a radially terminating manner. A larger diameter D enables the insertion of a thicker fastener 110, which is more stable with the same composition. The diameter D is furthermore $6/10$, preferably $7/10$, more preferably $8/10$ of a width B of the arm 40. In a preferred embodiment, the diameter D is 7.2 mm and the arm width B is 9 mm. If the opening 20 were arranged symmetrically on the arm 40 with the dimensions just mentioned, the arm 40 would be reduced to 0.9 mm in each case in two opposite regions of the opening. In particular, in these regions, the stability of the arm 40 would be greatly reduced, and deformation and/or damage to the arm 40 would be very likely under occurrent forces or torques.

The arm 40 further has a length L1 with which the arm 40 projects from the second longitudinal edge 14 in the transverse direction Y. The arm length L1 is preferably equal to or greater than a length L3 of the first and/or second transverse edge 16, 18. Due to the size of the arm length L1, the grounding clamp 1 can be held easily by the arm 40, which simplifies installation. The arm length L1 is furthermore greater than the length L2 of the recess 42 in the arm.

Figure 3:
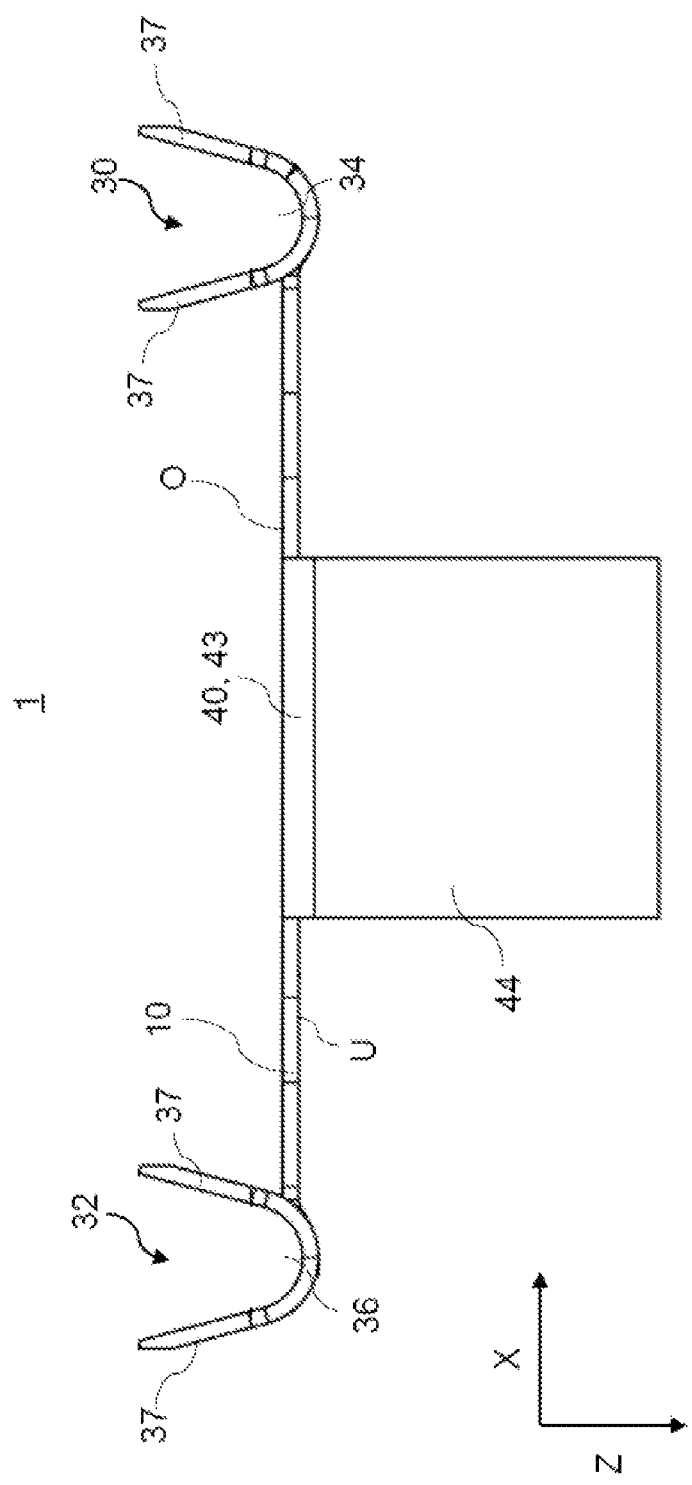
FIG. 3 is a side view of the first embodiment of the grounding clamp along a first direction.

FIG. 3 shows a side view of the first embodiment of the grounding clamp 1 in which the tab 44 is clearly visible. In the embodiment shown, the tab 44 has a rectangular, especially square, shape. The tab 44 is easily discernible visually and by touch, which is advantageous during installation of the grounding clamp 1.

The first and second cable fastening regions 30, 32 in FIG. 3 have a U-shaped or V-shaped cross-section. The legs of the U or V shape are formed by the at least two adjacent crimp tabs 37 in a crimp region 38*a, b, c, d*. A connecting piece between adjacent crimp tabs 37 at the level of the plate 10 forms a cable guide 34, 36 in the form of a channel. The channel facilitates the arrangement of the cables. The cable guide 34, 36 in the form of a channel connects the two crimp regions 38*a, b* and 38*c, d* to each other in each cable fastening region 30, 32 (see FIG. 4).

FIG. 5 shows the first embodiment of the grounding clamp 1 in an installed state. The grounding clamp 1 is arranged on a bolt or threaded bolt 110 and fastened with a nut 112 on the threaded bolt 110. The threaded bolt 110 is fixedly connected to a separate surface 100, such as a vehicle body. A cutout 102 is arranged in the separate surface 100 at a distance from the threaded bolt. In one embodiment, the cutout 102 is an opening. In another embodiment, the cutout 102 may be a depression in order to engage the tab 44 in a twist-proof manner. In the installed state, the tab 44 is engaged with the cutout 102 in a twist-proof manner. In particular, the tab 44 engages in the recess with more than ⅛, preferably more than ¼, more preferably more than ½ of its depth T2 in order to achieve a secure hold. The cutout 102 preferably surrounds the tab 44. In one embodiment, play can be formed between the tab 44 and the cutout 102; in an alternative embodiment, the cutout 102 surrounds the tab 44 flush.

The grounding clamp 1 is preferably made of a lightweight material, in particular a lightweight metal.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SYMBOLS

1 Grounding clamp
10 Plate
12 First longitudinal edge
14 Second longitudinal edge
16 First transverse edge
18 Second transverse edge
20 Opening
30 First cable fastening region
32 Second cable fastening region
34 First cable guide
36 Second cable guide
37 Crimp tabs
38a, b, c, d First, second, third, fourth crimp region
39a, b, c, d First, second, third, fourth inlet
40 Arm
42 Recess
43 Free end
44 Tab
100 Separate surface
102 Cutout
110 Bolt
112 Nut
B Width
D Diameter
L1 Arm length
L2 Length of the recess
L3 Length of the first and/or second transverse edge
O Upper side
S Mirror axis
T1 Depth of the recess
T2 Depth of the tab
U Underside X First direction, longitudinal direction
Y Second direction, transverse direction
Z Direction toward the underside of the plate

What is claimed is:

1. A grounding clamp for fastening and electrically contacting at least two cables to a separate surface, the grounding clamp comprising:
   a plate having a first longitudinal edge and a second longitudinal edge opposite the first longitudinal edge, wherein the first and second longitudinal edges extend in a first direction of the plate, and the plate having a first transverse edge and a second transverse edge opposite the first transverse edge, wherein the first and second transverse edges extend perpendicularly to the first and second longitudinal edges in a second direction of the plate;
   a first cable fastening region configured to fasten and electrically contact a first cable to the plate, wherein the first cable fastening region extends along the first transverse edge;
   a second cable fastening region configured to fasten and electrically contact a second cable to the plate, wherein the second cable fastening region extends along the second transverse edge;
   an opening arranged between the first and second cable fastening regions for inserting a fastener;
   an arm extending from the first or second longitudinal edge in the second direction so that the arm runs parallel to the first and/or second cable fastening region; and
   a tab which extends at a free end of the arm parallel to the first and/or second longitudinal edge and perpendicularly to a plane of the plate in a direction of an underside of the plate.

2. The grounding clamp according to claim 1, wherein the arm has at least one recess.

3. The grounding clamp according to claim 2, wherein the recess extends in the second direction at least half of a length of the arm.

4. The grounding clamp according to claim 3, where the recess extends in the second direction at least ¾ of the length of the arm.

5. The grounding clamp according to claim 3, where the recess extends in the second direction at least ⅞ of the length of the arm.

6. The grounding clamp according to claim 1, wherein the arm has a rectangular shape.

7. The grounding clamp according to claim 6, wherein the tab extends over an entire width of the arm.

8. The grounding clamp according to claim 1, wherein a depth of the tab is more than ⅛ of a length of the arm.

9. The grounding clamp according to claim 8, wherein the depth of the tab is more than ¼ of the length of the arm.

10. The grounding clamp according to claim 9, wherein the depth of the tab is more than half of the length of the arm.

11. The grounding clamp according to claim 1, wherein the opening is circular.

12. The grounding clamp according to claim 1, wherein a diameter of the opening corresponds to ⅗ of a width of the arm.

13. The grounding clamp according to claim 1, wherein the diameter of the opening corresponds to ⁷⁄₁₀ of the width of the arm.

14. The grounding clamp according to claim 1, wherein the diameter of the opening corresponds to ⅘ of the width of the arm.

15. The grounding clamp according to claim 1, wherein the first and second cable fastening regions extend along an entire extent of the first and second transverse edges, respectively, such that a first one of the at least two cables extends along the entire extent of the first transverse edge and a second one of the at least two cables extends along the entire extent of the second transverse edge.

16. The grounding clamp according to claim 15, wherein a crimp tab is disposed at each end of the first and second cable fastening regions.

17. The grounding clamp according to claim 1, wherein a crimp tab is disposed at each end of the first and second cable fastening regions.

18. The grounding clamp according to claim 1, wherein the first and second cable fastening regions extend along an entire extent of the first and second transverse edges, respectively, and wherein, in a direction of the first and second transverse edges, a center of the first and second cable fastening regions is aligned with a center of the opening.

19. The grounding clamp according to claim 18, wherein, in a direction of the first and second longitudinal edges, a center of at least one of the first and second longitudinal edges is aligned with a center of the opening.

\* \* \* \* \*